US010315326B2

(12) United States Patent
Achenbach et al.

(10) Patent No.: US 10,315,326 B2
(45) Date of Patent: Jun. 11, 2019

(54) COLD CUTS CUTTING MACHINE

(71) Applicant: Inauen Group AG, Herisau (CH)

(72) Inventors: Mark Dennis Achenbach, Biedenkopf (DE); Stefan Fritz, Angelburg Frechenhausen (DE)

(73) Assignee: Multivac Sepp Haggenmüller SE & Co. KG, Wolfertschwenden (DE)

(*) Notice: Subject to any disclaimer, the term of this patent is extended or adjusted under 35 U.S.C. 154(b) by 45 days.

(21) Appl. No.: 14/950,159

(22) Filed: Nov. 24, 2015

(65) Prior Publication Data

US 2016/0144527 A1 May 26, 2016

(30) Foreign Application Priority Data

Nov. 24, 2014 (CH) ....................................... 1806/14

(51) Int. Cl.
*B62D 7/06* (2006.01)
*B62D 11/00* (2006.01)
*B26D 7/06* (2006.01)

(52) U.S. Cl.
CPC ............ *B26D 7/0625* (2013.01); *B26D 7/06* (2013.01); *B26D 2210/02* (2013.01); *B26D 2210/08* (2013.01)

(58) Field of Classification Search
CPC .... B26D 7/0625; B26D 7/06; B26D 2210/08; B26D 2210/02
USPC ........................... 198/463.4, 530, 531, 369.2
See application file for complete search history.

(56) References Cited

U.S. PATENT DOCUMENTS

| | | | | | |
|---|---|---|---|---|---|
| 4,130,193 | A * | 12/1978 | Bourgeois | B65G 47/29 | 198/369.2 |
| 5,271,304 | A * | 12/1993 | Wygal | B26D 5/22 | 83/408 |
| 5,410,954 | A * | 5/1995 | Wygal | B26D 3/22 | 83/404 |
| 5,423,250 | A * | 6/1995 | Anderson | B26D 3/22 | 83/404 |
| 5,482,166 | A * | 1/1996 | Brown | A22C 17/002 | 209/580 |

(Continued)

FOREIGN PATENT DOCUMENTS

| | | |
|---|---|---|
| DE | 202013101903 | 5/2013 |
| EP | 0713753 | 5/1996 |

(Continued)

OTHER PUBLICATIONS

Great Britain Search Rpoert dated May 24, 2016 for GB1520729.3.

*Primary Examiner* — Jonathan G Riley
(74) *Attorney, Agent, or Firm* — Husch Blackwell LLP

(57) ABSTRACT

A cold cuts cutting machine for cutting food, such as sausage, cheese or meat, for example, into slices, in particular for simultaneously slicing at least two pieces of stick-shaped food by means of a cutting blade. A minimization or a cancellation, respectively, of adhesive and frictional forces or the production of a noncutting pass, respectively, is to be make possible thereby and the supply of the food, which is to be sliced, is to be improved further. The cold cuts cutting machine includes a lower and an upper traction belt, between which the product bar can be guided such that the lower traction belt can carry out a relative movement, which is substantially vertical to the conveying direction of the product bar, with respect to a cutting latch.

8 Claims, 4 Drawing Sheets

(56) References Cited

U.S. PATENT DOCUMENTS

| | | | | |
|---|---|---|---|---|
| 5,974,925 | A | 11/1999 | Lindee | |
| 6,409,011 | B1 * | 6/2002 | Ferguson | B65G 15/00 186/68 |
| 9,597,812 | B2 | 3/2017 | Schmeiser | |
| 2006/0162517 | A1 * | 7/2006 | Perini | B26D 3/161 83/37 |
| 2007/0214969 | A1 | 9/2007 | Mueller et al. | |
| 2011/0296964 | A1 * | 12/2011 | Muller | B26D 1/0006 83/23 |
| 2012/0137845 | A1 * | 6/2012 | Weber | B26D 7/01 83/13 |
| 2015/0122095 | A1 * | 5/2015 | Schmeiser | B26D 7/0625 83/42 |

FOREIGN PATENT DOCUMENTS

| | | | | |
|---|---|---|---|---|
| FR | 2789376 | A1 * | 8/2000 | B65G 15/00 |
| FR | 2964586 | A1 | 3/2012 | |
| GB | 2535277 | A | 8/2016 | |
| WO | 0230635 | | 4/2002 | |
| WO | 2005037501 | | 4/2005 | |
| WO | 2013/164143 | A2 | 11/2013 | |

* cited by examiner

COLD CUTS CUTTING MACHINE

FIELD OF THE INVENTION

The invention relates to a cold cuts cutting machine for cutting food, such as sausage, cheese or meat, for example, into slices, in particular for simultaneously slicing at least two stick-shaped pieces of food by means of a cutting blade.

BACKGROUND OF THE INVENTION

In the case of high-performance cutting machines, also called slicers, stick-shaped food is cut into slices or sliced, respectively, wherein at least one food stick is fed to a cutting blade. A sickle-shaped cutting blade rotates about a mostly fixed axis and is driven via the rotor shaft. The lift for cutting off the slices occurs from the shape of the sickle. In the alternative, circular blades also exist, the axis of rotation of which revolve about a fixed axis in a planetary manner. At least one slice is in each case cut off from a product bar in response to each rotations of the sickle blade or in response to every planet circulation of the cutting blade. The production capacity is increased accordingly by means of a plurality of product bars, which are guided in parallel. A cutting latch, which supports the product at least vertically, but which supports the product contour circumferentially in an advantageous manner, is arranged as counter blade to the rotating blade. For the most part, the contour incorporated into the cutting latch is thereby embodied with a slight play to the product, so as to minimize effects of friction.

EP 0713753 B1 shows a quick cutting machine comprising a cutting station and a drive, which drives the blade along a predetermined cutting path, a device for supporting the food sticks, which are to be cut, wherein each of the food sticks can be fed by means of its own feed drive in response to simultaneously feeding two food sticks and wherein blade and feed are engaged at an angle to the table plane of the cutting machine.

A different device for simultaneously slicing at least two food products is disclosed in WO 02/30635 A1, in the case of which a slicing of slices of the same thickness as well as a slicing of portions having a constant weight, is to be attained in spite of product differences, which are at hand. For this purpose, the product holders have a common base drive for synchronous movement, wherein an additional movement can be superimposed positively or negatively in the case of at least one product holder. This is attained by means of an auxiliary drive. An additional lifting of the product for changing the slice thickness is created by means of the auxiliary drive, if this is necessary based on the determined stack weights.

A further such device for slicing food follows from WO 2005/037501 A1, in the case of which the food sticks are transported to the blade on a conveying means. The rear ends of the food sticks are at least temporarily in contact with a means, for example a gripper, which does not have its own drive during the contact. This is to ensure that the food sticks are tensioned sufficiently firmly on the conveying means to the end and thus stay sliceable.

SUMMARY OF THE INVENTION

One aspect of the invention relates to a cold cuts cutting machine for cutting food, such as sausage, cheese or meat, for example, into slices, in particular for simultaneously slicing at least two stick-shaped pieces of food, which is provided with a further improved feed of the food, which is to be sliced and which makes it possible to minimize or avoid, respectively, adhesive and frictional forces or a noncutting pass, respectively.

Such adhesive and frictional forces are created by means of an inversion of the direction from the feed movement in response to cutting to the product retraction and by means of an inversion of the direction from the product retraction back to the feed speed. However, inaccuracies of the position of the product bar and thus of the slice, which is to be cut, can be created thereby when starting to cut again. This effect is caused in particular by adhesive or frictional forces, respectively, of the product bar with respect to the fixed cutting latch.

The bearing force of the product bar on the cutting latch is minimized by means of a movement of a lower traction belt of the cold cuts cutting machine, which preferably occurs vertically to the product feed direction. The lower traction belt can be pivoted for this purpose and is arranged in such a manner that the lifting movement can be a linear as well as a pivoting movement.

The same effect would also be attained by lowering the cutting latch prior to or with the initiation of the product retraction movement. It goes without saying that a combination of the movement of the cutting latch and of the lower traction belt leads to particularly short reaction times.

The relative movement between the bearing surface of the lower traction belt and the cutting latch is significant thereby.

Such a cutting machine, a slicer, comprises a conveyor for the food, which is to be sliced, to the cutting blade, a feed unit for the food, which is to be sliced, a storage table for the sliced food, as well as a control unit.

The feed unit preferably has a gripper carriage, on which at least one or any number of grippers are guided, according to the number of product bars, which are to be cut simultaneously.

Analogous to the prior art, the cutting blade is preferably removed from the product in axial direction to the noncutting pass, or is moved towards the product, respectively, when initiating cutting again, wherein combinations of both movements are also possible.

The feed movement in response to cutting as well as the retraction movement of the product bars prior to the noncutting pass is substantially accomplished by the traction belts and grippers.

Further advantageous embodiments of the invention are also disclosed.

In the case of the cold cuts cutting machine, the lower traction belt can thus be arranged so as to be pivotable about an inlet shaft. Likewise, it is capable of being used as stop for product bars in response to loading them/it.

Advantageously, the cutting latch is preferably arranged so as to be capable of being moved parallel to the cutting blade.

In addition to the belt drive, the lower traction belt can be provided with its own drive, preferably a crank drive, for the pivot or lifting movement, respectively.

The cutting machine according to the invention is characterized by a high degree of hygiene and by a long life-cycle of the product feed.

BRIEF DESCRIPTION OF THE DRAWINGS

The invention will be described in more detail below in an exemplary embodiment by means of a drawing. In the drawing

DETAILED DESCRIPTION

Figure 1:
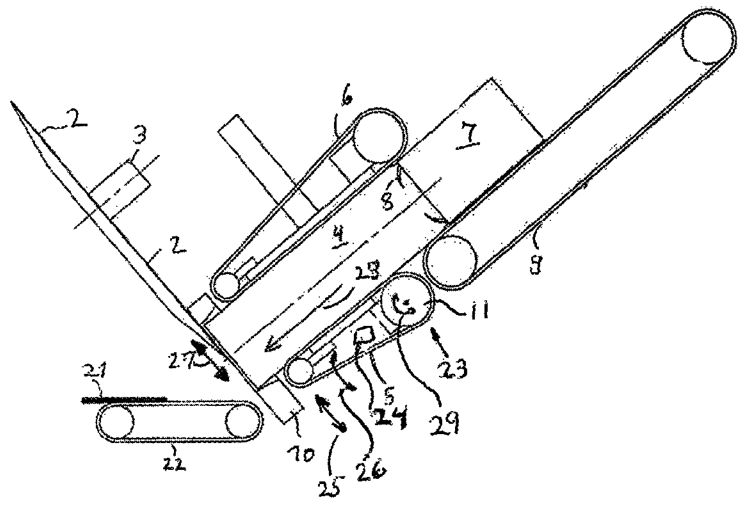
FIG. 1 shows essential elements of a slicer according to the invention comprising a lowered mouthpiece (cutting latch)

A cold cuts cutting machine according to the invention (FIG. 1) for slicing stick-shaped food (e.g. sausage or cheese) or product bars 4, respectively, into slices, a so-called slicer 1, comprises an inlet belt conveyor 9 of the food, which is to be cut, to a cutting device comprising a cutting blade 2, a conveyor comprising a lower and an upper traction belt 5, 6, a portioning belt 22 for the food, which is sliced into portions 21, as well as non-illustrated means for removing the sliced food to a non-illustrated vacuum packaging device. It furthermore comprises a non-illustrated control unit.

The cutting blade 2 can be fixed in the cutting device by means of screws or a quick-clamp device on an accommodation of a rotor shaft 3, which is connected to a drive motor. A feed plane for feeding the food, which is to be cut, which is followed therebelow by the portioning belt 22, is assigned to the cutting blade 2. The cutting blade 2 is arranged so as to be inclined in the direction of the portioning belt 22, which provides for an improved cutting line and which in particular significantly influences the storage quality of the cut slices to form the portion.

The drive motor sets the cutting blade 2 into rotation about the rotor axis thereof. For making the cut, the product bar 4 is fed to the cutting blade 2 with a feed, which corresponds to the desired slice thickness.

The cutting blade 2 is in particular a sickle blade, as it is disclosed in DE 202013101903 U1, for example, and on the circumference, it is provided with a spiraled cutting edge, which points outwards and which has a recess. It is furthermore provided with a centric receiving hole and can thus be directly and releasably assembled on a rotor shaft 3. The sickle-shaped cutting blade 2 rotates about the fixed rotor axis and is driven via the rotor shaft 3. The lift for cutting off the slices 20 follows from the shape of the sickle. In the alternative, a circular blade could also be used, the axis of rotation of which runs about a fixed axis in a planetary manner.

At least one slice 20 is in each case cut off from a product bar 4 in response to each rotation of the sickle blade or in response to each planet circulation of the circular blade. The production capacity is increased accordingly by means of a plurality of product bars 4, which are guided in parallel.

A movable cutting latch 10, which supports the product bar 4 at least vertically, but which supports the product contour circumferentially in a particularly advantageous manner, is arranged as counter blade to the rotating blade cutting blade 2.

The contour 13, which is incorporated into the cutting latch 10 to define an aperture through which the product bar passes through, is thereby embodied with a slight play to the product bar 4, so as to minimize effects of friction.

In response to the cutting process, the product bar 4 is moved forward by means of the lower traction belt 5 and is preferably also moved forward to the cutting blade 2 by means of the upper traction belt 6. Preferably, the upper traction belt 6 is pressed linearly onto or against the product bar 4, respectively, so as to increase the frictional and thus the actuator forces (traction) of both belts on the product.

The feed speed of the traction belts 5, 6 follows via the blade speed and the desired slice thickness.

Figure 2:
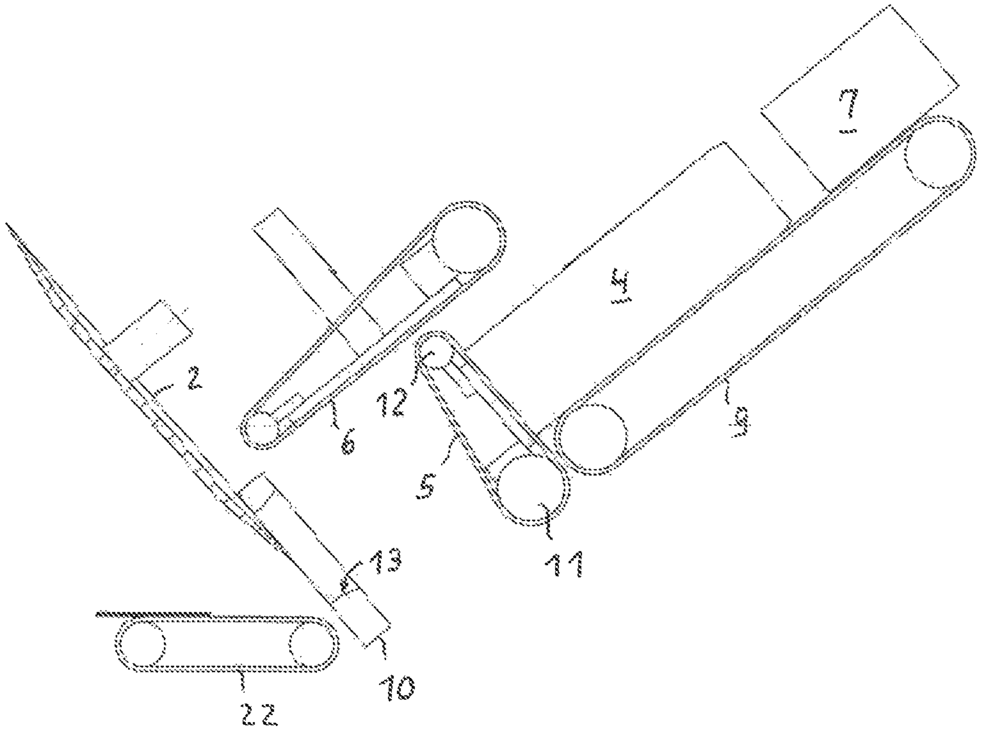
FIG. 2 shows the slicer according to FIG. 1 in response to loading.
Figure 3:
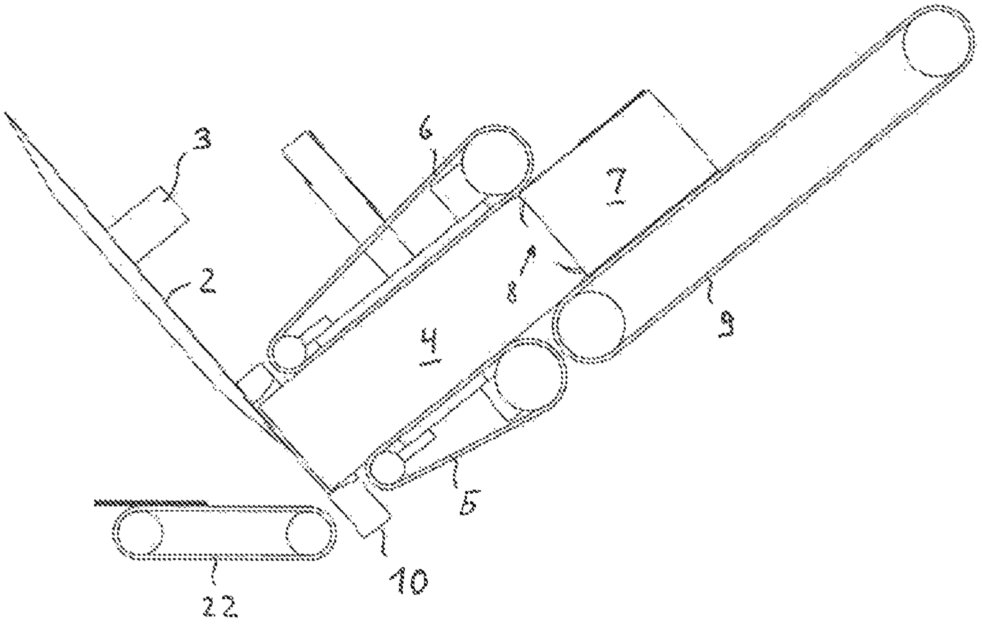
FIG. 3 shows the slicer according to FIG. 1 with a lower traction belt, which is pivoted upwards.
Figure 4:
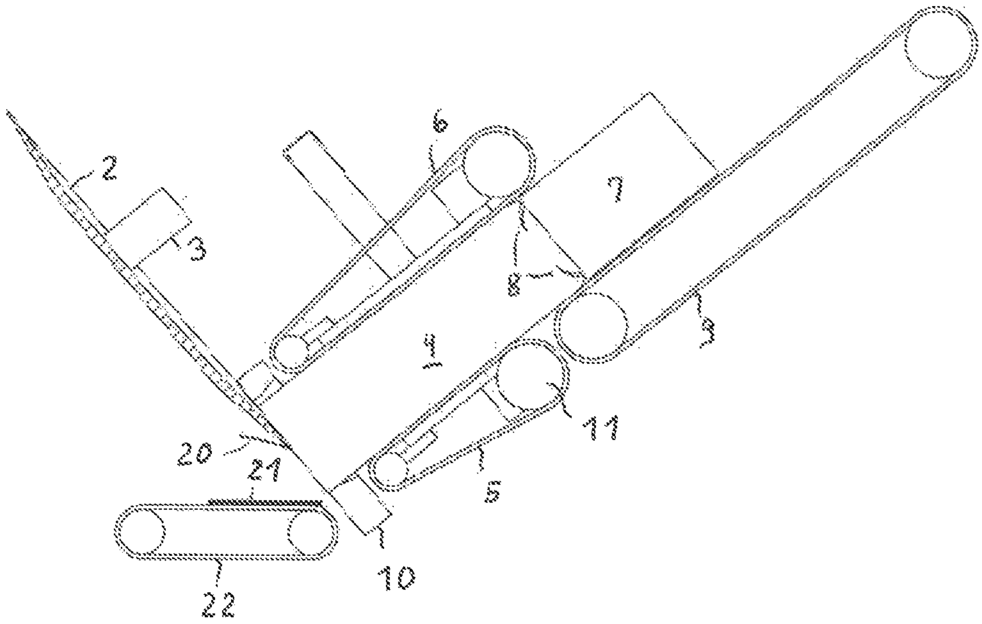
FIG. 4 shows the slicer according to FIG. 1 in response to the cutting process.

In addition to the linear engagement, the lower traction belt 5 can also be placed against a front side of the product bar 4 via a pivot movement (FIG. 2). By pivoting the lower traction belt 5 by approx. 90°, it furthermore serves as loading stop.

In response to the cutting process, however, the position of the lower traction belt 5 is stationary or can be adjusted so as to be stationary, depending on the product height.

At least the last piece of the product bar 4, which faces away from the cutting blade 2, is held by means of a product gripper 7, e.g. via claws 8 or also suction cups. The movement of the product gripper 7 takes place synchronous to the product movement of the traction belts 5, 6 in response to slicing the product bar 4.

The loading of the product bar(s) 4 occurs via the inlet belt conveyor 9. The product bars 4 are held either by a stop or the traction belts 5, 6, when the product gripper 7 is attached to the product bars 4. The grippers 7 can preferably be coupled to a gripper receiving beam of the gripper carriage via a quick-clamping device, so that they can be activated centrally by the stationary part of the slicer 1. They can be controlled accurately via a common mechanism.

The slices 20, which are cut off by the cutting blade 2, fall onto the portioning belt 22 (or also a rake, rotary plate or an X/Y table), preferably as movable support, whereby a portion 21 is formed mostly from a plurality of slices 20.

The portion 21 can be embodied in a stack-shaped and shingle-shaped manner or in special shapes.

The finally sliced portion 21 needs to be moved out of the falling space of the initial slice of a subsequent portion, before it hits the portioning belt 22.

In the case of high-performance cutting machines, the time period for the removal movement of the portion 21 is very short, because, with a few exceptions, the cutting blades 2 rotate continuously due to the inert mass. In response to a blade rotation speed of 600 cuts per minute, e.g., it thus follows that ten slice 20 are cut off each second and for each product bar 4, and that the time lag between two slices 20 is only approx. 0.1 second.

Only this short time period is thus available for removing and for portioning the portion 21.

The acceleration of the portion 21 for removal cannot be increased arbitrarily, so that the performance limits of a machine are reached very quickly. This is one of the reasons for carrying out so-called noncutting passes. A noncutting pass represents a blade rotation, without the cutting blade 2 cutting off slices 20 thereby or without cutting into the product, respectively.

As a result of such a noncutting pass, the time, which a blade rotation requires for removing the portion 21, is gained, whereas the average cutting rate of the machine decreases.

To be able to carry out noncutting passes, cutting blade 2 and product bar 4 need to be spaced apart from one another such that, after concluding the cutting process, the cutting blade 2 does not hit the product bar 4 before it starts to cut the next slice 20.

In the case of the prior art, the movement of the product bar 4 does not only need to be stopped thereby, but it also needs to be changed into a product retraction, so that a sufficient route// is available for accelerating to the original feed speed of the product bar 4 when starting to cut the next slice 20. The cutting blade 2 is thereby preferably also removed from the product in axial direction to the noncutting pass, or is moved towards the product, respectively, when starting to cut again, wherein combinations of both movements are also known.

The feed movement in response to cutting as well as the retraction movement of the product bars prior to the noncutting pass is substantially accomplished by means of traction belts and gripper means.

However, inaccuracies of the position of the product bar 4 and thus of the slice 20 occur in response to starting to cut again as a result of the inversion of the direction from the feed movement in response to the cutting to the product retraction and as a result of the inversion of the direction from the production retraction back to the feed speed. This effect is caused in particular by means of adhesive or frictional forces, respectively, of the product bar 4 with respect to the stationary cutting latch 10.

In contrast, the cold cuts cutting machine according to the invention provides for largely avoiding these adhesive and frictional forces.

For this purpose, the lower traction belt 5 is arranged in such a manner that the bearing force of the product bar 4 on the cutting latch 10 is minimized by means of a movement of the lower traction belt 5, which preferably occurs vertically to the product feed direction. This lifting movement can be a linear movement as well as a pivoting movement.

The product bar 4 can be guided in such a manner that the lower traction belt 5 can carry out a relative movement, which is substantially vertical to the conveying direction of the product bar 4 with respect to the cutting latch 10 as counter blade, so that the bearing forces of the product bars 4 on the cutting latch 10 can be changed or minimized, respectively. The cutting latch 10 itself can also carry out a relative movement, which is substantially vertical to the conveying direction of the product bar 4, so that the bearing forces of the product bar 4 on the cutting latch 10 are minimized The bearing force of the product bar 4 on the cutting latch 10 can be set dynamically during the cutting process so as to optimize the cutting result. It is obvious that a combination of the movement of the cutting latch 10 and of the lower traction belt 5 leads to particularly short movements and thus to short reaction times.

A relative movement between the bearing surface of the lower traction belt 5 and the cutting latch 10 is significant.

In a particularly preferred manner, the movement of the lower traction belt 5 takes place as pivoting movement 29 about the inlet shaft 11 (FIG. 2) thereof, so that the pivot movement 29 also serves to embody a stop in response to loading the product bar 4. As in the case of the upper traction belt 6, the inlet shaft 11 has a larger diameter than the outlet shaft 12.

A drive 23 for carrying out the pivot movement 29 via a crank drive 24, which is located in the vicinity of the dead center of the driving crank 24 in each case, turns out to be particularly advantageous thereby.

Compared to previously conventional pneumatic drives, the design is significantly simplified and is cost-efficient. Conventional plug connections, the tangle of pneumatic hoses as well as grease lubrication of the pneumatic cylinders can be omitted. This also serves to improve hygiene.

The preferred purely electric drive of the slicer 1 according to the invention makes it possible to work without compressed air.

LIST OF REFERENCE NUMERALS

1 slicer
2 cutting blade
3 rotor shaft
4 product bar
5 lower traction belt
6 upper traction belt
7 product gripper
8 claw
9 inlet belt conveyor
10 cutting latch
11 inlet shaft
12 outlet shaft
13 contour
20 slice
21 portion
22 portioning belt

The invention claimed is:

1. A cold cuts cutting machine for cutting food into slices, the cold cuts cutting machine comprising:

a cutting blade configured to simultaneously slice at least two stick-shaped product bars;

a feed for the at least two stick-shaped product bars to the cutting blade;

a lower and an upper traction belt configured to guide the at least two stick-shaped product bars there between, wherein the at least two stick-shaped product bars are arranged in the feed and between the upper traction belt and the lower traction belt, wherein the lower traction belt is pivotable about a shaft at an inlet of the lower traction belt in such a manner that the lower traction belt is able to carry out a relative movement substantially vertical to a conveying direction plane of the at least two stick-shaped product bars with respect to a cutting latch, wherein the relative movement causes the lower traction belt to displace the at least two stick-shaped product bars in a direction vertical to a conveying plane to change one or more bearing forces of the at least two stick-shaped product bars on the cutting latch during a cutting and noncutting process while the at least two stick-shaped product bars are arranged between the upper traction belt and the lower traction belt for regulating frictional forces of the two stick-shaped product bars with respect to the cutting latch;

wherein the cutting latch defines an aperture having a shape for supporting a perimeter of the at least two stick-shaped product bars and is arranged so as to be moved parallel to the cutting blade and substantially vertical to the conveying direction plane;

wherein the cold cuts cutting machine further comprises a control unit configured to initiate a combination of the movement of the cutting latch and of the lower traction belt both substantially vertical to the conveying direction plane to reduce the one or more bearing forces of the at least two stick-shaped product bars on the cutting latch.

2. The cold cuts cutting machine according to claim 1, wherein the feed comprises an inlet belt conveyor for loading the product bars, wherein the lower traction belt is pivotable in a direction towards the upper traction belt to a stop position wherein at said stop position, the lower traction belt is disposed as a stop for the at least two stick-shaped product bars while the at least two stick-shaped product bars are arranged on the inlet belt conveyor.

3. The cold cuts cutting machine according to claim 1, wherein the lower traction belt is provided with a lifting drive for rotating said lower traction belt about the shaft at the inlet between a first position and a second position, the first position being a feeding position and the second position being a stop position.

4. A method for cutting food into slices of at least two stick-shaped product bars by means of a cutting blade, the method comprising:

guiding the at least two stick-shaped product bars between an upper traction belt and a lower traction belt; and moving both the lower traction belt and a cutting latch simultaneously in substantially vertical directions to the conveying direction plane of the at least two stick-shaped product bars to vary the position of the at least two stick-shaped product bars relative to the cutting latch to minimize one or more bearing forces of the at least two stick-shaped product bars on the cutting latch for minimizing adhesive and/or frictional forces of the two stick-shaped product bars with respect to the cutting latch at least during cutting of the at least two stick-shaped product bars.

5. The method according to claim 4, further comprising:

moving the lower traction belt with a lifting movement that serves to embody a stop for the at least two stick-shaped product bars in response to loading and gripping the at least two stick-shaped product bars.

6. The method according to claim 4, wherein moving the cutting latch fixes and releases the cutting latch in a cutting machine.

7. The method according to claim 4, wherein the lower traction belt is moved using a drive of the lower traction belt, wherein moving the lower traction belt also regulates the one or more bearing forces of the at least two stick-shaped product bars on the cutting latch during a noncutting process.

8. The method according to claim 4, wherein moving the lower traction belt comprises:

moving the lower traction belt toward the upper traction belt via a pivoting movement.

* * * * *